US006116402A

United States Patent [19]

Beach et al.

[11] Patent Number: 6,116,402

[45] Date of Patent: Sep. 12, 2000

[54] VOUCHER CODING FOR SELF-SERVICE COIN DISCRIMINATOR

[75] Inventors: Kirk Beach, Issaquah; Daniel A. Gerrity, Bellevue, both of Wash.

[73] Assignee: Coinstar, Inc., Bellevue, Wash.

[21] Appl. No.: 09/178,441

[22] Filed: Oct. 23, 1998

[51] Int. Cl.[7] .................. G06F 7/00; G09C 3/00

[52] U.S. Cl. .................. 194/216; 380/54

[58] Field of Search .................. 194/216; 705/75; 380/54, 62

[56] References Cited

U.S. PATENT DOCUMENTS

| | | | |
|---|---|---|---|
| 5,509,692 | 4/1996 | Oz | 283/70 |
| 5,564,546 | 10/1996 | Molbak et al. | 194/216 |
| 5,936,541 | 8/1999 | Stambler | 705/75 |

FOREIGN PATENT DOCUMENTS

| | | | |
|---|---|---|---|
| WO 97/30409 | 8/1997 | WIPO | G06F 17/60 |

*Primary Examiner*—Robert P. Olszewski
*Assistant Examiner*—Bryan Jaketic
*Attorney, Agent, or Firm*—Sheridan Ross P.C.

[57] ABSTRACT

A system which assists in detecting alteration of value documents or transmissions, such as a coin counter voucher is provided. Voucher information such as the voucher value is included in the voucher in an encrypted or otherwise modified form. When the voucher is presented for redemptions, the encrypted information is decrypted and compared to independently available voucher information. Failure of the information to match indicates that the voucher has been altered or should otherwise be further checked.

26 Claims, 4 Drawing Sheets

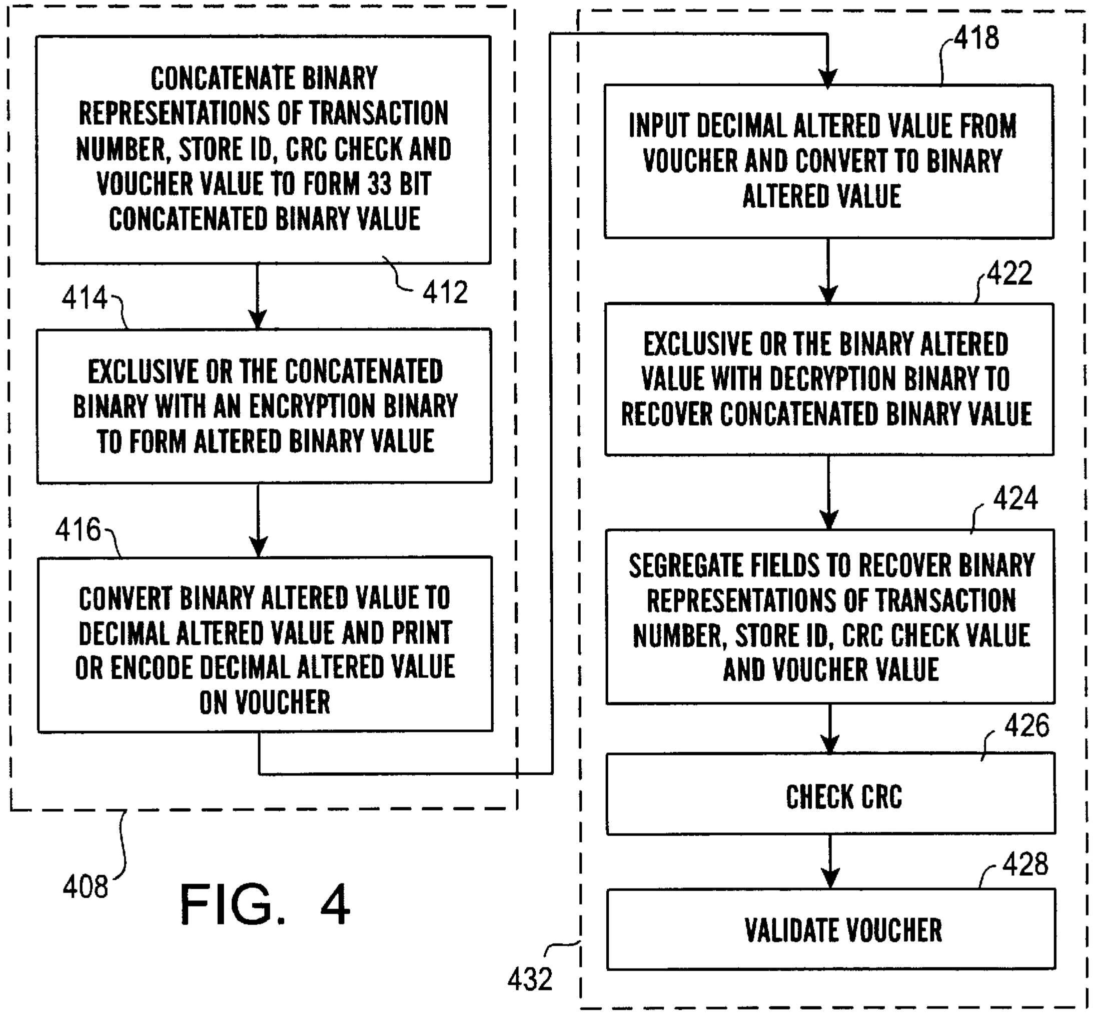
FIG. 4
FIG. 5
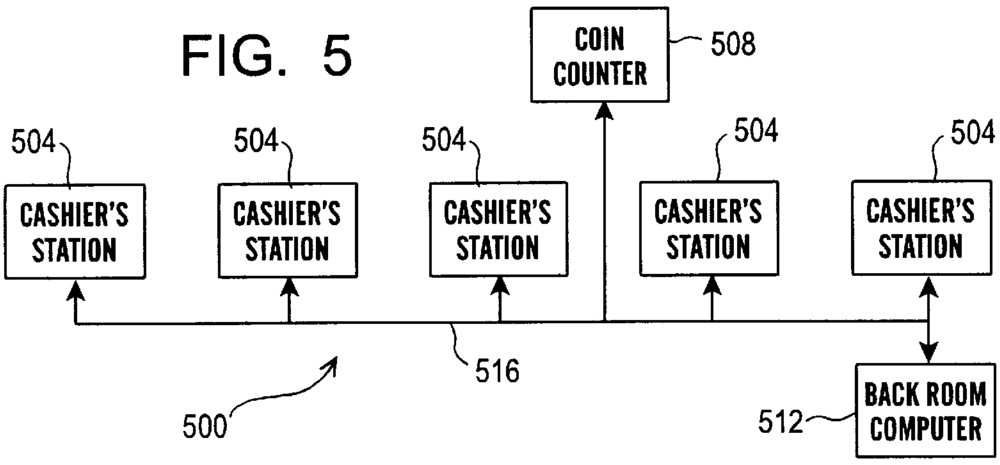

VOUCHER CODING FOR SELF-SERVICE COIN DISCRIMINATOR

Cross-reference is made to U.S. application Ser. No. 08/883,780 and to U.S. application Ser. No. 08/689,826 filed Aug. 12, 1996 for coin counter/sorter and coupon/voucher dispensing machine and method, which is a continuation of U.S. application Ser. No. 08/255,539 filed Jun. 6, 1994, which is a continuing application of U.S. application Ser. No. 07/940,931 filed Sep. 4, 1992, all of which are incorporated herein by reference.

The present invention relates to a system for use in connection with a voucher and in particular, in connection with a voucher provided by a coin discriminator or counting mechanism to assist in detecting counterfeit or altered vouchers.

BACKGROUND INFORMATION

As described in U.S. Pat. No. 4,620,079 (incorporated herein by reference) a coin counter discriminator may be provided which receives and counts a plurality of coins and outputs a voucher, i.e. an output which itself has a value, related to the value of the an arbitrary number of multi-denominated counted coins, and which may be redeemed or exchanged for such value. In at least one application of a coin counter/discriminator, a number of such discriminators are positioned at retail locations and are configured to facilitate use by untrained users, particularly, ordinary untrained customers (as opposed to, e.g., employees) of the retail locations. Such users typically bring jars or other containers having a plurality of coins to the machine and dump the coins into a coin receiving region or area, in a random, jumbled mass, i.e. in a an unoriented fashion, with the coins typically being of a plurality of different denominations, and often including non-coin items, (paper items, lint, keys, screws, washers and the like) and/or foreign or other non-acceptable or undesirable coins. The machine is configured to discriminate and/or separate acceptable or desirable coins from other objects and also to discriminate one denomination of coin from another. The acceptable coins are counted, preferably by denomination, and a total of acceptable coins or a total value of acceptable coins is determined in this manner. The acceptable coins are retained, e.g. in a bin or bag within the discriminator and non-coin objects, unacceptable coins or undiscriminable objects are treated as waste and/or returned to the user.

Although there is no theoretical reason why such a coin discriminator could not be configured to output government-issued paper currency ("cash") in response to at least some of the counted and retained acceptable coins, in at least one embodiment it is preferred to output a voucher which includes written and/or encoded indicia which indicates, at least indirectly, information including the value which the voucher has. The value of the voucher is not necessarily equal to the "face value" of the counted acceptable coins. In one embodiment, the value of the voucher will be equal to the value of the counted coins minus a fee charged for the counting service. The fee may be calculated in a number of fashions such as a flat fee, a fee based on the number of coins counted, a fee which takes into consideration the types or denominations of the coins counted, a fee which is a percentage of the value or a weighted percentage based on type or denomination of coins, and the like. It would also be possible to provide a configuration in which the value of the voucher exceeded the face value of the counted coins e.g. as a promotion to encourage use of the machine for a limited period or to take into account coins which have an actual value exceeding the face value (e.g. recognized rare or otherwise valuable coins) and the like.

Although, in at least one configuration, a voucher is in the form of a paper slip printed with certain information, as described more fully below, the voucher may also take other forms including digital or electronic codes recorded on or transferred to a magnetic card, a smart card, transferred to a bank account or other account, e.g. over a preferably encrypted or otherwise secure telephone or other communication link, transferred to a computer such as a retail location "back room" computer or other computer (e.g. to credit a user's account or provide a credit against purchases and the like).

After the voucher is output, in at least some systems a user will use or obtain the value of the voucher e.g. by redeeming the voucher. It is anticipated that, typically, a user such as a retail customer will present the voucher to a retail cashier (e.g. the cashier at a grocery store checkout location), often as part of a purchase transaction, and the retail cashier will redeem the voucher by paying the voucher in cash or by providing a credit for the amount of the voucher against purchases made by the customer.

In this regard, it can be seen that the voucher itself is treated as having value and accordingly, there is a potential for unscrupulous individuals to obtain or devise a counterfeit, duplicate or altered voucher in order to obtain value to which they are not entitled. For example, some individuals may attempt to make one or more photocopies, or otherwise duplicate a voucher and present it for redemption. Some individuals may attempt to counterfeit an entire voucher, such as by drafting or composing an image of a voucher. Some individuals may alter a legitimate voucher (or an image of a legitimate voucher) e.g. changing the amount or value indicated or encoded on or in the voucher. Accordingly, it would be useful to provide a system which assists in detecting duplicate, counterfeit or altered vouchers.

In a number of situations, it is desired to provide for relatively rapid redemption or other processing of presented vouchers, in order to avoid customer ill will or excessive employee time that could be the result of excessively-long voucher processing. In a number of situations, voucher processing is facilitated with the use of store checkout equipment such as checkout (point-of-sale or "POS") computers, scanners and the like. However, modifications of such equipment to provide for additional functions can involve additional programming time, can increase execution or processing time, can impose extra computing burden on processors in such systems and may require linking the POS system to an external system, thus involving additional hardware and requiring extensing programming and/or system configuration. Accordingly, it would be advantageous to provide a system for detecting duplicate, counterfeit, or alternate vouchers which can achieve rapid voucher processing without undue burden on existing computer, scanning or other equipment at retail locations.

In many retail locations, checkout equipment includes the capability of bar code scanning e.g. for identifying merchandise. Typically, the associated software is configured to recognize bar codes according to a standard bar code system such as a system promulgated by the Uniform Code Council Inc. of Dayton, Ohio. Accordingly, it would be useful to provide a system for detecting counterfeit, duplicate or altered vouchers which was at least partially (preferably, fully) compatible with a standard bar code system.

SUMMARY OF THE INVENTION

The present invention includes the recognition of certain problems including problems generally as discussed above.

According to one embodiment, a voucher includes information usable for ascertaining the validity of a voucher, but which is provided preferably in an altered form such as being permuted, shifted, encrypted or the like. In this way, a person who alters a voucher, such as by changing the printed or displayed amount, cannot avoid detection of the alteration without also knowing how to permute, shift, encode, etc. the information used for validation. Preferably, any permutation, shifting, encryption or the like which is used is of a nature that once the procedure for reversing the permutation, shifting or other encryption is known, execution of the reverse processes (e.g. reverse shifting, decryption), can be performed relatively easily (e.g. automatically, by a computer) so as to impose relatively minor computing or time burdens on the validation process.

Unless otherwise indicated, encryption refers generally to altering the form or appearance of information (preferably so as to prevent at least the casual viewer/reader from understanding the information) in such a way that it may be manipulated to recover the original information but such that it is not readily apparent, from the altered information, how the altered information is related to the original information. Encryption, in this sense, includes, but is not limited to, permuting digits or characters of a field, adding, subtracting, multiplying or dividing (to or by) key values, performing binary operations on digital fields, performing operations on concatenated fields and the like.

In one embodiment, a voucher includes a printed, human-readable indication of an amount, and, preferably includes a transaction number or other identifier number. An encoded version of the amount, transaction number, transaction date, expiration date, retail location, or combination(s) thereof is also printed or encoded, preferably as at least part of a bar code (to facilitate validation and redemption). When the voucher is presented, the bar code or other encoded number is decrypted or otherwise processed to recover the value and transaction number. The value and/or transaction number can then be used as part of a validation process such as by comparing the recovered encoded value to the printed value or transaction number and/or checking the transaction number or the like against a negative checklist (i.e. a list of transaction numbers which have already been redeemed or are otherwise suspect). Vouchers which are not validated can be refused payment or can be more closely inspected or provided with an identification process, such as recording the customer's driver's license number, getting manager approval, and the like.

A number of systems can be used for altering or encoding values, transaction numbers or combinations. Two basic (not necessarily exhaustive) classes of encryption include using a not-generally-known algorithm, and a known key, and using a not-generally known key with a known algorithm. In one embodiment, one or more tables are used e.g. to control digit shifting and/or digit or value addition/subtraction. By basing such processes on tables, time and computing burdens are reduced (as compared with, e.g., more computationally burdensome processes such as standard encryption/decryption) and it becomes relatively straightforward to change the alteration system, (e.g. by downloading one or more new value tables). Other types of manipulation can be used such as digital/binary conversions and the like. In this way, many types of voucher alterations or fabrications become apparent upon an attempted redemption and monetary losses attributable to such alterations or fabrications are reduced or eliminated.

BRIEF DESCRIPTION OF THE DRAWINGS

FIG. 4 depicts a transaction number/value manipulation procedure according to an embodiment of the present invention;

FIG. 5 depicts a store system including a coin discriminator of a type usable in connection with embodiments of the present invention.

DETAILED DESCRIPTION OF THE PREFERRED EMBODIMENT

Figure 1:
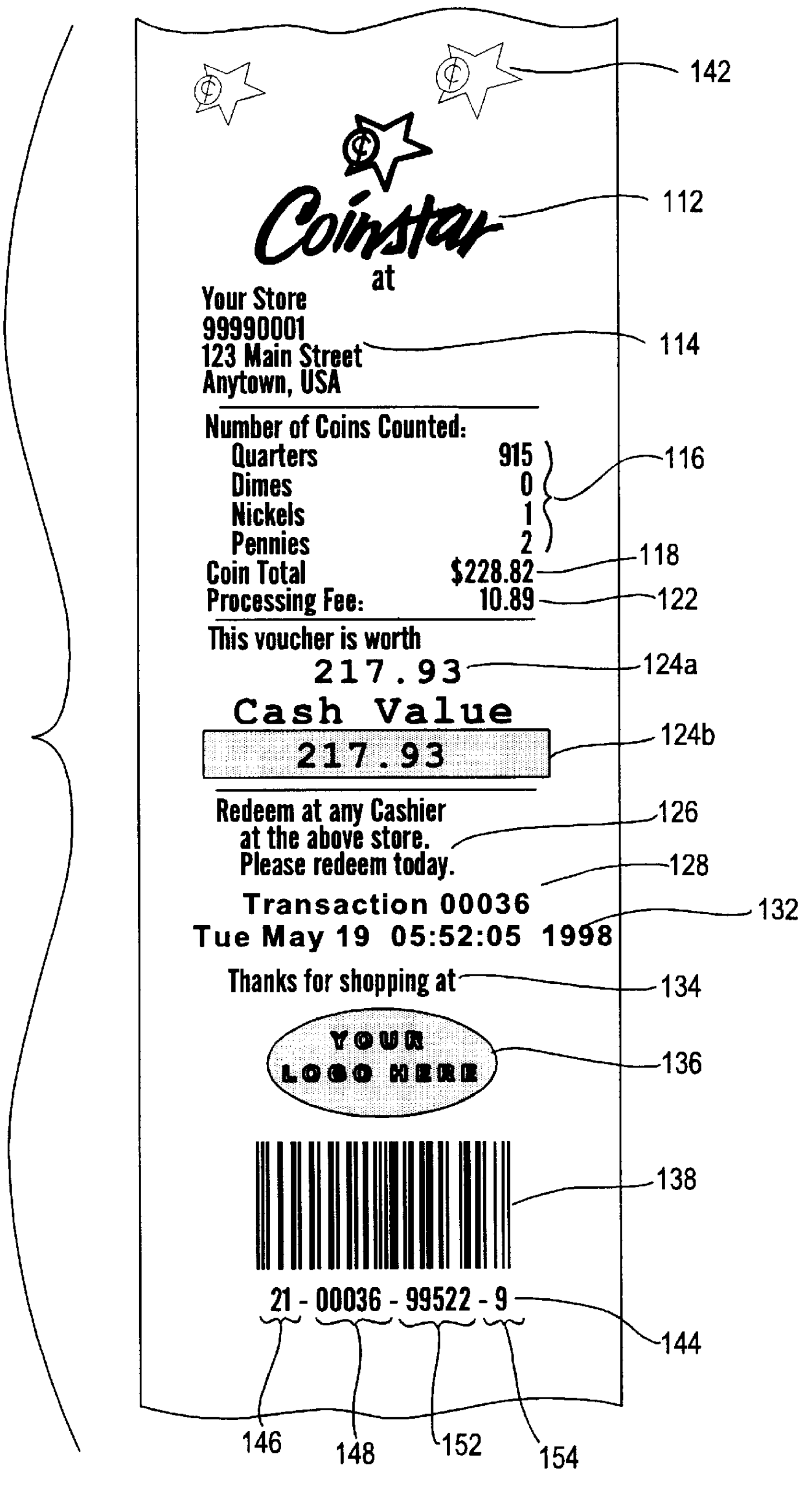
FIG. 1 depicts the appearance of a voucher of a type which may be used in accordance with an embodiment of the present invention.

FIG. 1 shows the appearance of a voucher of a type which may be used in connection with embodiments of the present invention. The present invention can be used with a number of types of paper or non-paper (such as electronic) vouchers. In the example of FIG. 1, the voucher is a paper voucher with a number of indicia printed thereon. Some of the indicia may be pre-printed (before a transaction occurs) or the entire voucher may be printed after coins are counted. In the depicted example, the voucher includes a coin discriminator or system logo or name 112, the name and address of the retail location where the discriminator is located 114, a tally of the number of various coin denominations counted 116, an indication of the total value of coins counted 118, an indication of the processing fee subtracted 122, the value or worth of the voucher 124*a,b* typically equal to the coin total 118 minus the processing fee 122, instructional information regarding how to redeem the voucher 126, a transaction number, a transaction date and time 132, a store message 134, a store or retail location logo 136 and a bar code 138. If desired, background printing 142 and/or microprinting and/or watermarking, encoded fibers and the like can be printed or provided as part of the paper or pre-printed, e.g. to assist in distinguishing counterfeit vouchers.

As is typical with bar codes, the bar code 138 is accompanied by a human readable, digital representation 144 of the number represented by the bar code 138. In the depicted embodiment, the 13-digit bar code 144 includes four fields—a two digit value indicative of the number system and type of item encoded (e.g., 2 equals random weight item, 3 equals National Drug Code, and the like) specified by the Uniform Code Council 146. A five-digit indication of the transaction number 148 (e.g. equal to item 128), a five-digit encrypted or encoded item 152 as described more thoroughly below and a check digit, calculated according to the Uniform Code Council rules (used, e.g., in verifying that the bar code is scanned correctly).

In one embodiment, the five-digit encrypted number 152 is an encryption of the voucher value 124*a,b*. Examples of possible encryption procedures are described below and numerous other types of encryption can be used. In any case, unless a potential counterfeiter knows how to properly encrypt the value, when a voucher with an altered voucher value 124*a,b* is presented, it is possible to use a verification procedure at the checkout stand to detect such alternation of the voucher by decrypting the encrypted value 152 and comparing to the value 124*a,b* printed on the face of the voucher. If only the value printed on the face of the voucher 124*a,b* is altered, without changing the encrypted value portion of the bar code 138 and/or the corresponding printed encrypted value 152, such alteration of the voucher value 124*a,b* can be detected. Similarly, if both the voucher value (unencrypted) 124*a,b* is altered and the encrypted value 152 is altered, but the alteration of the encrypted value does not provide, upon the decryption, a value equal to the unencrypted voucher 124*a,b*, again the attempted alteration can be detected.

Figures 2A, 2B, 2C:
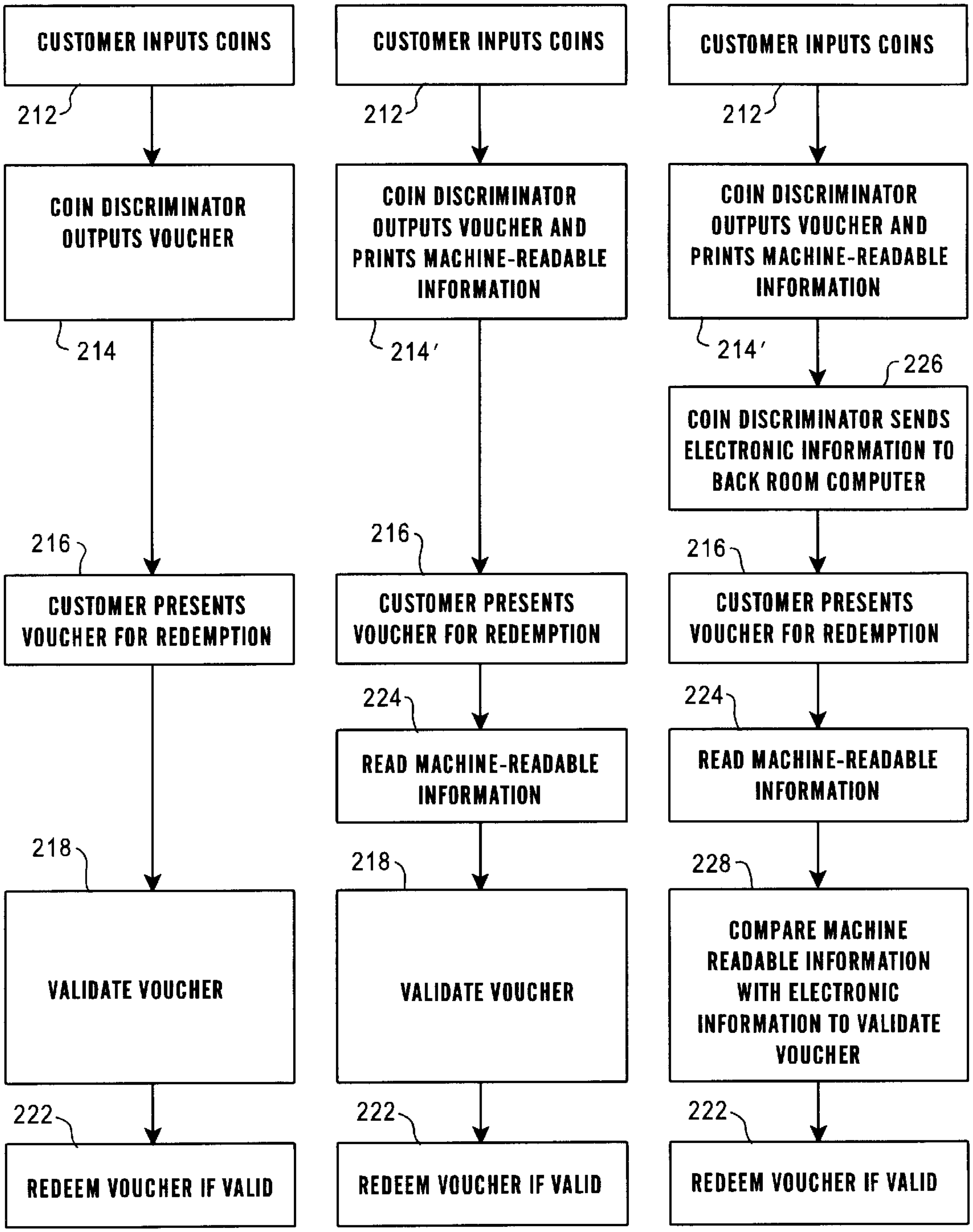
FIGS. 2A–C are flowcharts depicting voucher generation validation and redemption according to certain embodiments of the present invention.

FIG. 2A shows the process of using a voucher with an encrypted value for use in detecting voucher alterations. In the embodiment of FIG. 2A, a customer normally inputs coins 212, and the coin discriminator outputs a voucher 214, similar to that depicted in FIG. 1. At some point, the customer presents the voucher for redemption 216. In the embodiment of FIG. 2A, it is possible to validate the voucher 218 by using the encrypted value voucher 152. In this embodiment, in order to achieve a voucher validation, the encrypted number 99522152, is decrypted preferably by automatic or manual entry of the encrypted number 152 into a computer, such as a retail location checkout computer which, as depicted in FIG. 5, is preferably coupled to a retail location back room computer 512 which contains decryption tables or other information or procedures for decrypting. If desired, it is possible to perform the step of validating the voucher 218 on only some presented vouchers, such as performing random or spot-checking of vouchers, checking only vouchers which are for an amount greater than a threshold amount, or which are older than a predetermined time or date.

The decrypted voucher value based on the encrypted value 152 is then compared, either automatically (e.g. by comparison in the point-of-purchase or back room computer) or manually (e.g. by displaying the decrypted amount which the clerk can visually compare with the value 124*a,b* printed on the voucher) in order to validate the voucher 218. Whereupon, if the voucher is valid, it is redeemed 222.

It is believed useful to base the altered or encrypted validation information at least partially on the voucher value, particularly since it is likely a voucher that has been altered will involve alteration of the value. However, it is also possible, in addition to or in place of using the voucher value, to use other numbers or information associated with the voucher such as a transaction number, date and time, store number or other identifier, a computer-generated unique (or pseudo-unique) key value, and the like. In configurations in which a customer number (or other identifier) is associated with a voucher (such as when the coin discriminator is configured to accept a "frequent-customer card," credit card, debit card or the like identifying a customer or to receive identification information input by the customer) the customer identification, preferably altered or encrypted, can be provided as part of the voucher information and used e.g. to determine whether the person redeeming the voucher was the person who was identified on the voucher.

In the embodiment of FIG. 2B, the voucher is configured to include machine-readable information 214'. By providing information in machine-readable form, it is possible to perform some or all steps involved in the voucher verification or redemption in an automatic fashion, e.g. without requiring keyboard or other manual output of voucher information. In the embodiment of FIG. 2B, the machine-readable information is read 224 after the customer presents the voucher for redemption, and preferably, the machine-readable information is used during the validation 218 or redemption 222.

In procedures 2A and 2B, there is no need for the coin counter 508 to be coupled to the back room computer or cashier's station, i.e. the coin counter 508 can be a "standalone" device. In the embodiment of FIG. 2C, the coin counter or discriminator 508 is coupled by communication link to the retail location back room computer 512 as depicted in FIG. 5. The coin discriminator sends electronic information to the backroom computer 226 which includes information that can be used during a validation step. The information to be used in a validation step can include many of the types of information depicted in FIG. 1 including the unencrypted value 124*a,b*, the encrypted value 152, the transaction number 128, the time and date 132, the store identification information 114 and the like. In the embodiment of FIG. 2C, validation can include comparing information printed or encoded on the voucher with the information that was transmitted to the back room computer. For example, alterations in the unencoded value 124*a,b* can be automatically detected by comparing 228 a voucher value indicated by or encrypted in the bar code 138 with the value stored in the back room computer 512 corresponding to the particular transaction number or time of the voucher.

Figure 3:
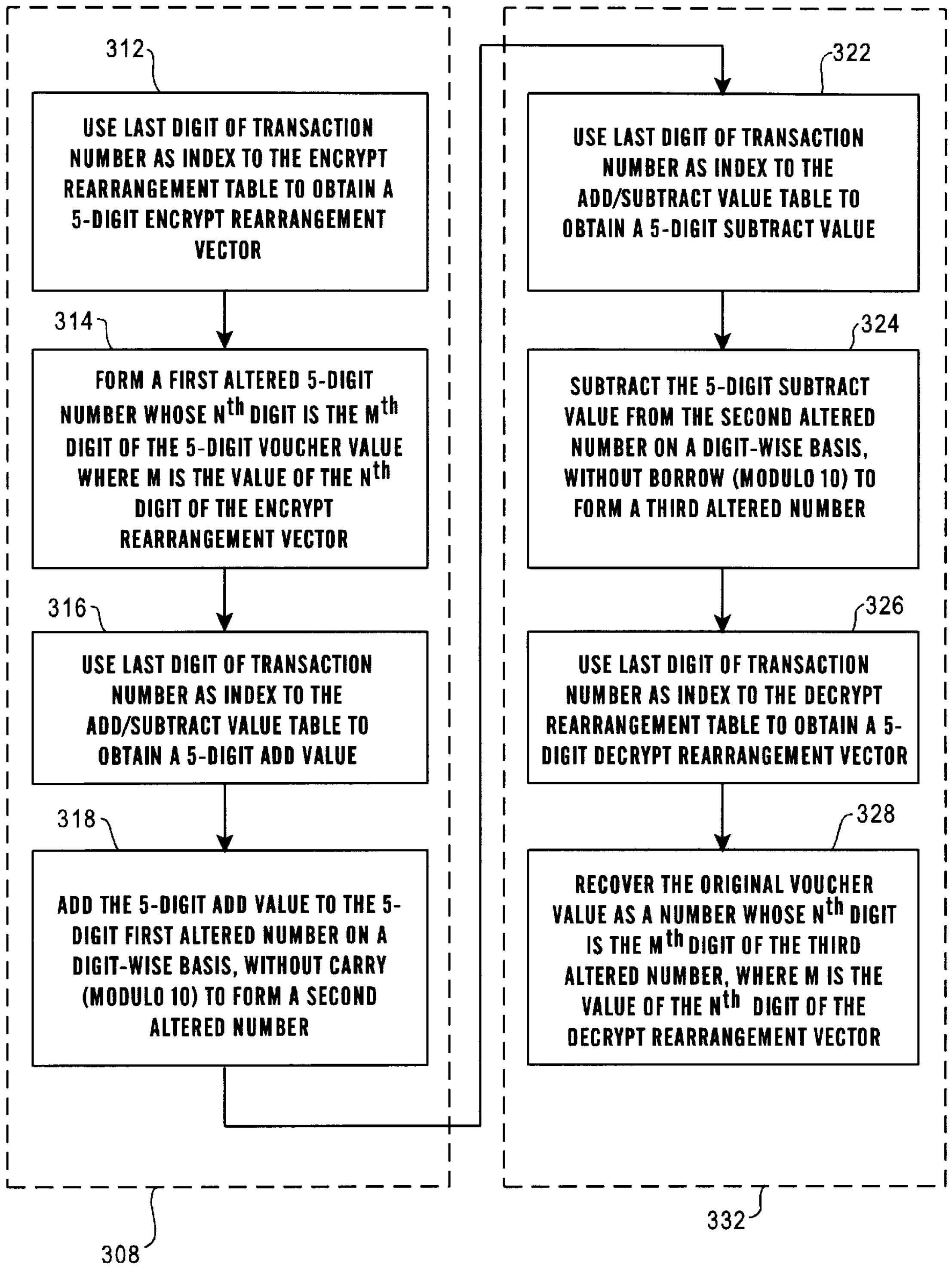
FIG. 3 is a flowchart depicting a transaction number/value manipulation procedure according to an embodiment of the present invention.

FIG. 3 depicts one method for encrypting a voucher value 124*a,b*. The example of FIG. 3 relates to a voucher having a maximum of five decimal digits (i.e. a voucher with a value no greater than $999.99). In some configurations, vouchers having a value greater than the maximum encodable or encryptable value (in this example, $1,000 or more) can be provided with a special encryption code (e.g. 0) requiring, e.g., manual verification or validation of a voucher.

In the example of FIG. 3, first and second tables are provided, giving numerous possible encryption values for use in encrypting. Tables I and II below, provide examples of such tables.

TABLE I (rearrangement table)

| Last Digit | Key |
|---|---|
| 0 | 32541 |
| 1 | 51432 |
| 2 | 42153 |
| 3 | 25341 |
| 4 | 14352 |
| 5 | 24513 |
| 6 | 31452 |
| 7 | 14253 |
| 8 | 51423 |
| 9 | 25134 |

TABLE II (encryption key)

| Last Digit | Key |
|---|---|
| 0 | 95175 |
| 1 | 36987 |
| 2 | 24789 |
| 3 | 12547 |
| 4 | 63257 |
| 5 | 58214 |
| 6 | 27691 |
| 7 | 35896 |
| 8 | 12345 |
| 9 | 85214 |

In these examples, there are 10 possible encryption values that may be used, and accordingly, a table index having 10 possible values is appropriate. In the example of FIG. 3, the last digit of the transaction number is employed as the table index value. Accordingly, the last digit of the transaction number 128 is used as an index to the encrypt rearrangement table (Table I) to obtain a five-digit encrypt rearrangement vector 312. In the example of FIG. 1, the last digit of a transaction number 128 is 6, and accordingly, the encrypt rearrangement vector to be used, as shown in Table I, is "31452". The vector is used to form a first altered five-digit number whose Nth digit is the Mth digit of the five-digit voucher value 124*a* where M is the value of the Nth digit of the encrypt rearrangement vector 314. In the present example, the first altered five-digit number would thus be 72931. Note that this value is the five digits of the voucher value 124*a* with the digits rearranged so that the first digit of the first altered number is the third digit of the voucher value, the second digit of the first altered number is the first digit of the voucher value, the third digit of the altered number is the fourth digit of the voucher value, the fourth digit of the first altered number is the fifth digit of the voucher value, and the fifth digit of the first altered number is the second digit of the voucher value, in accordance with the rearrangement vector 31452.

According to the procedure of FIG. 3, a second encryption step, using Table II is then applied. Again, the last digit of the transaction number ("6" in the present example) is used as an index to the add/subtract value table (Table II) to obtain a five-digit add value, namely 27691. Each digit of the add value is separately added to the corresponding digit of the first altered number (i.e. digit-wise addition) without any carry (i.e. using modulo 10 addition) resulting in a second altered number. In the present example, digit-wise, modulo 10 addition of 27691 plus 72931 yields the five-digit number 99522, which is then the number printed on the voucher 152 as depicted in FIG. 1. Accordingly, steps 312 through 318 result in an encryption procedure 308 which may be performed in the coin counter computer 508 or a coupled computer such as a back room computer 512.

When the voucher of FIG. 1 is presented for redemption, preferably the bar code 138 is scanned, and the five-digit encoded value 152 is used for validation purposes. To perform the validation 332, the last digit of the transaction number 128 ("6" in the present example) is used as an index to the add/subtract value table (Table II) which is stored in or available to the computer at the cashier station 504 where the voucher is presented. Because the decryption process involves reversing the addition step (i.e. subtracting the same number that was previously added) the add/subtract value table used for decryption purposes can be identical to that used (Table II) for encryption. In this case, using the last digit of the transaction number ("6") as an index to the add/subtract value table yields 322 a five-digit subtract value, in this case 27691. The five-digit subtract value is then subtracted from the second altered number (i.e., in the present example, subtracted from 99522) on a digit-wise basis without borrow (i.e. using modulo 10 arithmetic) to form a third altered number 324 which, in this case, yields the number 72931. Again, the last digit of the transaction number ("6") 128 is used as an index to a decrypt table to obtain a five-digit decrypt rearrangement vector (which, in this example, is 25134) 326. Although, to provide for relatively rapid computational speed, it is preferred to store a decrypt table, it is also possible to derive or compute the proper decrypt rearrangement vector from the corresponding encrypt rearrangement vector. In the present example, the Mth digit of the decrypt rearrangement vector will be equal to P where P is the ordinal number (counting left to right) of that digit of the corresponding encrypt rearrangement vector which equals M. The decrypt rearrangement vector is used to recover the original vector or voucher value 124 as a number whose Nth digit is the Nth digit of the third altered number, where M is the value of the Nth digit of the decrypt rearrangement vector 328.

FIG. 4 depicts another decryption scheme that can be used to encrypt and decrypt voucher information. In the example of FIG. 4, binary representations of voucher information, in this case, binary representations of a transaction number, store ID number, cyclic redundancy check (CRC) number and voucher value are concatenated to form, in this example, a 33-bit concatenated binary value 412. This concatenated binary value is exclusive ORed with an encryption binary value to form a 33-bit altered binary value 414. The encryption binary value can be any of a number of binary numbers, provided the encryption binary number is also available during the decryption process. In one embodiment, the encryption binary value is based on the store identification number (since this will be available to the store computer upon an attempted redemption). The 33-bit altered binary value is then converted to a decimal altered value using normal binary-to-decimal conversion resulting in, e.g., a ten-digit decimal value which is then printed or encoded on the voucher 416. The encryption procedure 408 can be performed in the coin counter 508 or the coupled back room computer 512. When the voucher is presented for redemption, the decimal altered value from the voucher is input (either manually, e.g. using the keyboard, or automatically, e.g., by scanning a bar code) and the decimal value is converted to a binary altered value such as a 33-bit binary altered value 418.

The binary altered value thus obtained is exclusive ORed by the decryption binary value (such as decryption binary value based on the store identification number in the example described above) to recover the concatenated binary value 422. As noted above, the concatenated binary value contains fields having binary representations of the transaction number, store ID, CRC, and voucher values (e.g.). Accordingly, these binary fields may be segregated 424, and the various values may be used for validation and similar purposes such as performing data integrity checks (such as checking the CRC 426) and/or validating the voucher using, e.g. the decoded voucher value in a fashion similar to that described above 428. If desired, the CRC can be used to verify a sucessful conversion, thus facilitating the use of multiple converions e.g. over a time perios. For exarnple, it is possible to use the month-of-issue of the voucher to perform a look-up in the transpostion table, or as part of the binary encryption key. It is also possible to use te store number as all or part of the encryption key, e.g. to aid detection of cross-shopper redemption attempts.

The format of the voucher and/or format or standards for bar code can impose restraints or limits on the number of digits available for various pieces of information. For example, according to one bar code standard, a total of ten decimal digits may be available for encoding information at the discretion of the voucher designer. For example, in the configuration of FIG. 1, ten decimal digits (148 and 152) are free to be provided by the coin discriminator. The manner is which these digits are assigned to various fields will determine the range of values available for those fields. For example, in the configuration of FIG. 1, five decimal digits are designated for expressing the voucher value so that the maximum voucher value that can be encoded under this system would be $999.99.

In the embodiment of FIG. 4, if it is assumed that ten decimal digits are available for conveying the encrypted binary value, this essentially means that the maximum number of binary bits available to hold the various (concatenated) binary fields will be 33 (since the maximum number encoded by 34 bits ($2^{34}$) would require at least 11 decimal digits alternatively ($\log_2$ (9,999,999,999)=33.219). In this case, the manner in which the 33 available binary digits are distributed among the various fields determines the maximum value or range for that field. For example, if 16 of the 33 bits are used for holding the binary equivalent of the voucher value, the maximum voucher value that can be indicated will be $655.35 ($2^{16}-1=65,535$). Accordingly, if the scheme of FIG. 4 is to be used in connection with a bar-coded value provided in accordance with Uniform Code Council standards, the binary field sizes should be judiciously selected to provide the desired or necessary ranges for various items. In one embodiment, in addition to the bits provided for the voucher value, seven bits are used for the transaction number (providing a range of 0–128, decimal) 5 bits provided for the store ID number (providing a range of 0–32, decimal) and 5 bits for a CRC check value. Although this scheme provides a smaller range for the transaction number than the range of the configuration of FIG. 1 (which provides five decimal digits for the transaction number) it is believed that in some situations, a relatively smaller transaction value range will be acceptable, particularly if the transaction number can be combined with other information such as store location and/or date/time. By using binary fields for encoding voucher information as described in connection with FIG. 4 regardless of their correspondence to various decimal digits, it can become possible to encode a relatively large number of different types of fields or information.

In light of the above description, a number of advantages of the present invention can be seen. The present invention provides a way to detect at least some forms of voucher counterfeiting, alterations, duplication, fabrication, and the like e.g. by including encoded or encrypted voucher information which cannot be readily replicated and/or using encryption/decryption schemes which are relatively resistant to being broken. Preferably the encryption or encoding can be accomplished without requiring, for their decryption, time or computing resources beyond those available in normal retail transactions or facilities. The present invention is able to provide detection of voucher alterations, duplications and the like in a manner which is partially or fully automated so that time or manpower investments need not be made in manually entering data or validating or redeeming vouchers. Embodiments of the present invention can be implemented in a fashion consistent with standard retail establishment procedures or equipment such as in a fashion consistent with Uniform Code Council bar code or other standards, preferably in a manner such that the same scanning hardware and/or software used for normal retail procedures such as checkout procedures can be used in implementing embodiments of the present invention substantially with little or no modification, e.g. requiring only data needed to recognize particular types of bar codes and to branch to voucher verification, redemption, or other voucher handling routines. The procedures used in the encryption 308 and decryption 332 of the procedure of FIG. 3 involve processes which are, for typical computing devices, relatively rapid in terms of execution time, such as table lookup procedures, add/subtract procedures, and digit shift and rearrangement procedures. Accordingly, it is believed that one of the potential advantages of a procedure similar to that depicted in FIG. 3 is that it can be implemented on cashier station computers 504 in existing configurations which may have relatively low-powered computers such as those based on 80286 processors. In this way, it is believed feasible to implement the present invention without imposing significant additional wait or processing time to achieve voucher validation or redemption.

It is believed that the difficulty of breaking an encryption code according to the present invention is especially high in the case of coin counter vouchers since legitimate coin counter vouchers typically tend to have a relatively small range of values (i.e. few legitimate vouchers with values greater than a few tens of dollars would typically be available to a putative counterfeiter). In general, the smaller the range of encrypted data available to a code-breaker, the more difficult it is to break the code. A number of variations and modifications of the invention can be used. Although features of the present invention are described in connection with an example in which a voucher is a printed voucher (e.g. magnetic cards, electronic transfers and the like), some or all features of the present invention can be used in connection with at least some other types of vouchers (e.g. magnetic cards, electronic transfers and the like), as will be apparent to those of skill in the art after understanding the present disclosure. Although particular encryption or alteration schemes have been described and are believed to be particularly useful especially in those situations in which computational time or power available for decryption and/or validation are limited, other encryption/decryption schemes can be used, including those generally known for data encryption such as RAS, DES, public/private key systems, and the like. Although an encryption system has been described which involves the step of adding and a step of rearranging, numerous alterations and variations are possible such as performing the steps in a different order, interchanging addition and subtraction, using normal rather than modulo addition or subtraction (where sufficient digits are available), 1's complement and multiple keys. Although indexing to encryption value tables was described in connection with using a particular digit of transaction number as an index, it is possible to use different indices for the different tables (Tables I and II), or other indices can be used, including other digits of a transaction number, hashes or other modifications of a transaction number or digits thereof, other information in place of or combined with the transaction number (or digits thereof) such as the transaction date, time, location code, customer identification and the like. Preferably, in addition to or in place of, validating by comparing a decrypted voucher value with a printed (unencrypted) voucher value, a "negative check file" test is performed to identify vouchers which correspond to vouchers which have already been redeemed or may otherwise be suspect. For example, the negative check file may include transaction numbers, date-time information or other voucher identification information for previously redeemed vouchers at a particular store or vouchers redeemed within a certain interval of time, voucher identifiers known to be associated with vouchers previously altered or fabricated, or the like. Although examples described herein include encoding of all digits of a voucher value, it is possible to configure voucher validation procedures which provide encoding or encryption of only some digits of the value (or other field), such as a certain number of least significant or most significant digits, odd-numbered digits and the like. In these configurations, encoded selected voucher value digits cannot be used to, by themselves, indicate the value of the voucher, and accordingly, the full voucher value would need to be provided in another form such as being provided in a different field of the bar code, provided in a different region of the voucher, provided to the cashier computer through another route (e.g. by being sent from the coin counter to the back room computer and then to the cashier computer when the voucher is presented for redemption). In one embodiment, rather than performing a specific voucher validation step, it is possible to achieve many of the same benefits by always encoding or encrypting the voucher value and always redeeming a voucher in an amount equal to the value indicated by the decrypted voucher value, on the assumption that those attempting to alter the unencrypted value indicator 124_a,b_ will fail to realize that the redemption will be based on decryption of an encrypted value (and thus will fail to alter the encryption value) and/or will fail to understand how to alter the encrypted value (will fail to understand the encryption procedure) in such a way as to consistently achieve a goal of increasing a voucher value in a manner likely to escape notice. Although it is preferred to use a programmable computer for encrypting, decrypting and/or validating, it is possible to use other devices such as hand-wired logic devices, programmable logic arrays, application-specific integrated circuits and the like.

Although the present invention has been described in connection with a coin discriminator, it can be used in other contexts such as providing encoded, encrypted or other altered information on printed or electronic coupons, tickets, gaming items or tokens, passes, checks, product or service bar codes, or other documents or communications, including electronic communications.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. Those of skill in the art will, after understanding the present disclosure, know how to provide hardware and software for implementing, making and using the invention. It is intended the appended claims be construed to include alternative embodiments to the extent permitted.

What is claimed is:

1. Apparatus for providing a voucher comprising:

a coin discriminator which receives randomly oriented coins including a plurality of acceptable coins, all in one place, and discriminates different denominations of said acceptable coins, said coin discriminator including a computer which outputs an indication of a first value related to the value of said acceptable coins; and an output unit which provides at least first output which includes an encrypted version of said first value.

2. Apparatus, as claimed in claim 1, wherein said first output includes an encrypted version of transaction identifying information.

3. Apparatus for providing a voucher comprising:

a coin discriminator which receives randomly oriented coins including a plurality of acceptable coins, all in one place, and discriminates different denominations of said acceptable coins, said coin discriminator including a computer which outputs an indication of a first value related to the value of said acceptable coins; and a printer, controlled by said computer to print a voucher for said first value, including printing of an encrypted version of first information, said first information including said first value.

4. Apparatus, as claimed in claim 3, wherein said printer is controlled to print machine-readable information, including said encrypted version.

5. Apparatus, as claimed in claim 3 wherein said encrypted version includes numerical digits obtained from said first information by a process that includes shifting the digit order and adding at least a first value.

6. Apparatus, as claimed in claim 3, wherein said first information includes transaction identifying information.

7. Apparatus, as claimed in claim 6 wherein said transaction identifying information is selected from the group consisting of a transaction number, a date, a time and a location code.

8. A process for exchanging coins for paper currency comprising:

a) automatically counting a plurality of coins to determine a first value related to the value of said plurality of coins;

b) printing a voucher which includes a human readable indication of said first value and an encrypted version of said first value;

c) presenting said voucher to a cashier for redemption;

d) decrypting said encrypted version to obtain an decrypted value and redeeming said voucher for an amount equal to said decrypted value.

9. A process, as claimed in claim 8 wherein said voucher is redeemed if said decrypted value matches said human readable indication.

10. A process as claimed in claim 8 further comprising repeating steps a, b and c to provide a second voucher; and decrypting said encrypted version on said second voucher if said value exceeds a predetermined amount or if said voucher is older than a predetermined age.

11. A process as claimed in claim 8 wherein said step of printing includes printing a machine-readable representation of at least said encrypted version.

12. A process as claimed in claim 8 wherein said step of printing includes printing a machine-readable representation of said encrypted version and of said first value and further comprising using a computer to decrypt said encrypted version and compare to said first value.

13. A process for providing a voucher comprising:

receiving, in a coin discriminator, randomly oriented coins including a plurality of acceptable coins, all in one place discriminating different denominations of said acceptable coins to provide a first value related to the value of said acceptable coins; and outputting an encrypted version of said first value.

14. A process as claimed in claim 13 wherein said step of outputting includes printing a bar code which represents said encrypted version.

15. A process as claimed in claim 13, wherein said step of outputting includes outputting an encrypted version of transaction identifying information.

16. Apparatus for providing a voucher comprising:

means for receiving randomly oriented coins including a plurality of acceptable coins, all in one place, discriminating different denominations of said acceptable coins and outputting an indication of a first value related to the value of said acceptable coins; and means for calculating and outputting an encrypted version of said first value.

17. Apparatus as claimed in claim 16 wherein said means for calculating and outputting comprises means for printing a voucher, and further comprising means for detecting alterations of said voucher.

18. Apparatus, as claimed in claim 17 wherein said means for detecting comprises means for decrypting said encrypted version and comparing to an unencrypted version.

19. Apparatus, as claimed in claim 18 wherein said unencrypted version is printed on said voucher.

20. Apparatus, as claimed in claim 16, wherein said means for calculating and outputting calculates and outputs an encrypted version of transaction identifying information.

21. A computer-implemented process for encrypting a coin-counting voucher comprising:

receiving, in a coin discriminator, randomly oriented coins including a plurality of acceptable coins, all in one place discriminating different denominations of said acceptable coins to provide a first value related to the value of said acceptable coins;

permuting the digit order of a number which includes at least one of:

said first value; and transaction identifying information to provide a first permuted number; and adding a selected number to said first permuted number.

22. A process as claimed in claim 21 wherein said step of permuting digit order is performed in accordance with a permutation vector selected from a first table.

23. A process as claimed in claim 22 wherein said selected number is selected from a second table.

24. A process as claimed in claim 21 wherein said step of adding includes modulo digit-wise addition.

25. A computer-implemented process for encrypting a coin-counting voucher comprising:

receiving, in a coin discriminator, randomly oriented coins including a plurality of acceptable coins, all in one place discriminating different denominations of said acceptable coins to provide a first value related to the value of said acceptable coins;

concatenating a binary representation of said first value with at least a second binary value to form a concatenated binary value;

performing a binary-to-digital conversion on said concatenated binary representation and outputting the resultant digital value.

26. A process as claimed in claim 25 wherein said second binary value includes a binary representation of at least one of a transaction number, a date, a time and a location code.

* * * * *